US011852124B2

(12) United States Patent
Gaard et al.

(10) Patent No.: US 11,852,124 B2
(45) Date of Patent: Dec. 26, 2023

(54) WIND TURBINE TRANSFORMER SYSTEM

(71) Applicant: Siemens Gamesa Renewable Energy A/S, Brande (DK)

(72) Inventors: Jesper Gaard, Odense S (DK); Thorkil Munk-Hansen, Fredericia (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 144 days.

(21) Appl. No.: 17/624,871

(22) PCT Filed: Jul. 16, 2020

(86) PCT No.: PCT/EP2020/070180
§ 371 (c)(1),
(2) Date: Jan. 5, 2022

(87) PCT Pub. No.: WO2021/013700
PCT Pub. Date: Jan. 28, 2021

(65) Prior Publication Data
US 2022/0275790 A1    Sep. 1, 2022

(30) Foreign Application Priority Data
Jul. 22, 2019  (EP) .................................. 19187491

(51) Int. Cl.
*F03D 80/80* (2016.01)
*F03D 13/20* (2016.01)
(Continued)

(52) U.S. Cl.
CPC ............. *F03D 80/82* (2016.05); *F03D 13/20* (2016.05); *H01F 27/28* (2013.01); *H01F 27/402* (2013.01);
(Continued)

(58) Field of Classification Search
CPC .......... F03D 80/82; F03D 13/20; H01F 27/28; H01F 27/402; H02K 7/1838; F05B 2240/912
See application file for complete search history.

(56) References Cited

U.S. PATENT DOCUMENTS

2012/0025539 A1    2/2012  Wagoner et al.
2012/0057976 A1*   3/2012  Matsunobu ............... F03D 1/06
                                                           416/204 R
(Continued)

FOREIGN PATENT DOCUMENTS

DE    10 2016 200800 A1    7/2017
EP        2 426 354 A2     3/2012
(Continued)

OTHER PUBLICATIONS

International Search Report & Written Opinion for PCT/EP2020/070180 dated Nov. 10, 2020.

*Primary Examiner* — Viet P Nguyen
(74) *Attorney, Agent, or Firm* — Schmeiser, Olsen & Watts LLP

(57) ABSTRACT

Provided is a wind turbine, including: plural transformers, including a first transformer and at least one second transformer, the transformers being connectable to at least one generator, in particular via at least one converter, wherein the transformers are arranged within an inside of the wind turbine.

18 Claims, 4 Drawing Sheets

Figure 1:
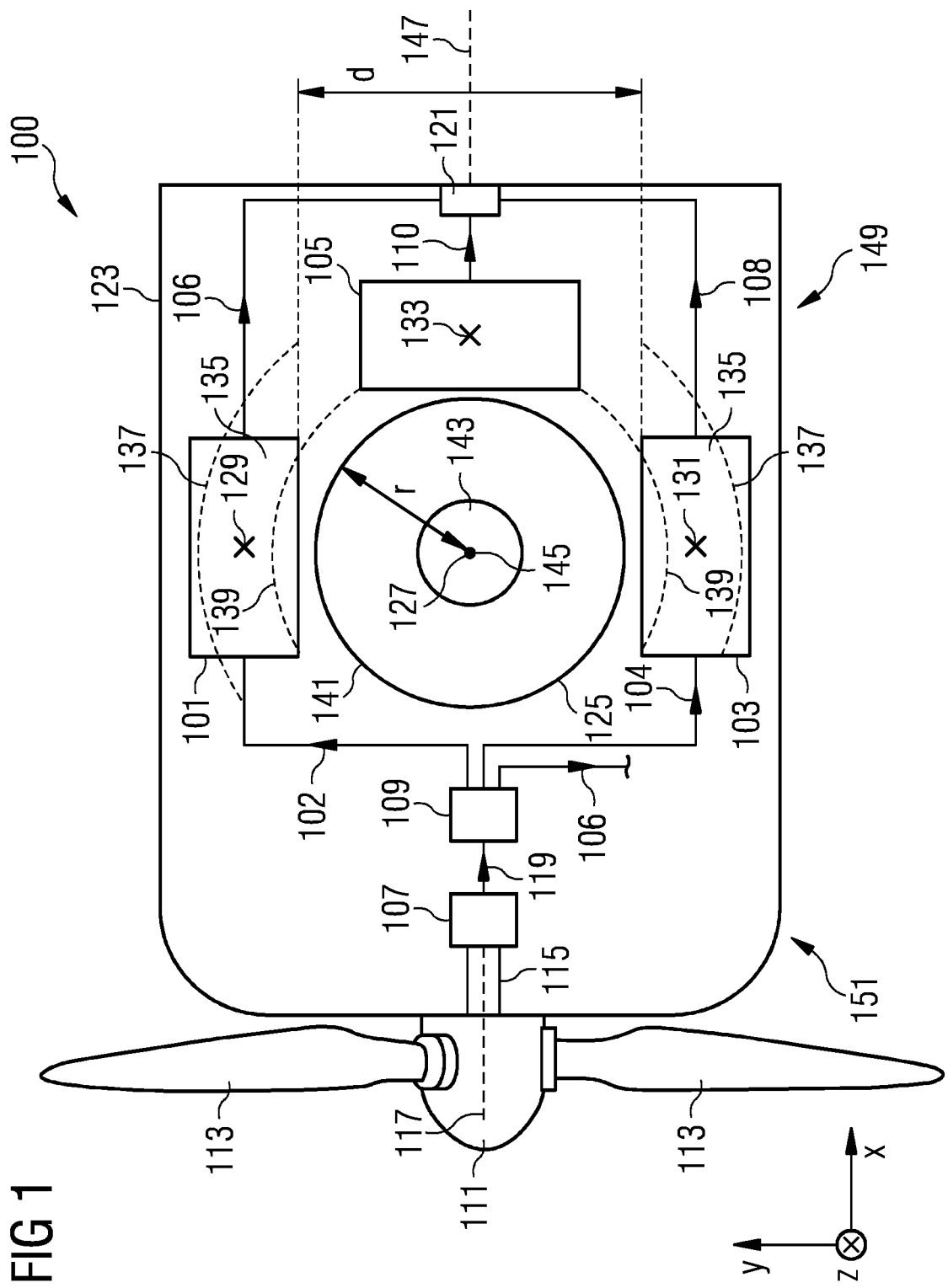

(51) Int. Cl.
  *H01F 27/28* (2006.01)
  *H01F 27/40* (2006.01)
  *H02K 7/18* (2006.01)
(52) U.S. Cl.
  CPC ...... *H02K 7/1838* (2013.01); *F05B 2240/912* (2013.01)

(56) References Cited

U.S. PATENT DOCUMENTS

2013/0224013 A1   8/2013   De Broe
2014/0252775 A1   9/2014   Hillerbrandt

FOREIGN PATENT DOCUMENTS

ES       2 407 593 A2    6/2013
JP       2017 145734 A   8/2017
WO       2010/069315 A2  6/2010

* cited by examiner

WIND TURBINE TRANSFORMER SYSTEM

CROSS-REFERENCE TO RELATED APPLICATIONS

This application claims priority to PCT Application No. PCT/EP2020/070180, having a filing date of Jul. 16, 2020, which claims priority to EP Application No. 19187491.6, having a filing date of Jul. 22, 2019, the entire contents both of which are hereby incorporated by reference.

FIELD OF TECHNOLOGY

The following relates to a wind turbine having a transformer system including plural transformers which are arranged in an inside of the wind turbine.

BACKGROUND

Conventionally, a wind turbine comprises a wind turbine tower, a nacelle arranged on top of the wind turbine tower. Within the nacelle, a rotation shaft at which plural rotor blades are mounted is arranged. The rotation shaft drives a generator which is electrically connected to a converter which outputs an AC power stream having a substantially fixed frequency to a wind turbine transformer. The wind turbine transformer transforms the AC power stream to higher voltage, such as from between 690 V and 20 kV or between 10 kV and 220 kV.

Conventionally, a wind turbine has a single step-up transformer installed. Conventionally, the rating of the transformer (for example regarding tolerable voltage and/or current) is relatively limited such that it can be designed in a compact efficient and cost-optimized manner. Nowadays, the demand regarding the amount of power to be produced by a wind turbine increases which requires also more powerful transformer which is heavier and larger and also more complex.

Thus, there may be a need for a wind turbine having a transformer system which can support higher power throughput than conventionally known transformer systems and which also has a restricted size, costs, and complexity.

SUMMARY

An aspect relates to a wind turbine, comprising: (e.g., a transformer system including) plural transformers, comprising a first transformer and at least one second transformer, the transformers being connectable to at least one generator, in particular via at least one converter, wherein the transformers are arranged within an inside of the wind turbine.

The wind turbine may comprise a wind turbine tower, a nacelle arranged on top of the tower such as enabling rotation of the nacelle around a longitudinal axis of the tower (during yawing). Within the nacelle, a rotation shaft at which plural rotor blades are mounted may be arranged. The rotation shaft drives a generator (for example a permanent magnet synchronous machine) directly or optionally via a gearbox. In particular, a direct drive wind turbine wherein the rotation shaft directly drives the generator without a gearbox is supported by embodiments of the present invention. In other embodiments of the present invention the rotation shaft indirectly drives the generator via a gearbox. The generator may output a variable frequency power stream to an AC-DC, DC-AC converter comprising plural controllable switches. The converter may output a substantially fixed frequency power stream which is supplied to the plural transformers. Each of the plural transformers may be characterized by a same transformation ratio such as between 690 V and 66 kV. Each of the transformers may for example be configured and designed to transform a voltage between 690 V and 20 kV at a primary side to a voltage between 10 kV and 220 kV at the secondary side. Furthermore, each of the transformers may for example be configured for a rating of between 5 MVA and 30 MVA. In total, the wind turbine may be configured and also the plural transformers may in combination be configured to provide power output between 10 MW and 50 MW.

Having plural transformers within an inside of the wind turbine may enable to increase power output compared to a conventional wind turbine without causing problems regarding increased size in particular of the nacelle of the wind turbine or mechanical instability.

All transformers may be connected to exactly one generator or to plural generators. The generator may be a generator having a single (for example three-phase) winding set or may be a generator having multiple (for example three-phase) winding sets. Thus, the generator may for example comprise a segmented generator having two, three, four or even more segments forming a whole circumference of the generator. Each segment may be operated independently from any other of the segments. Embodiments of the present invention thus support a single segment generator and a multi-segment generator.

When plural transformers are provided inside the wind turbine, these plural transformers may be appropriately arranged within the inside of the wind turbine, for example for balancing mass such that the mechanical load acting on the wind turbine tower and/or the nacelle may be reduced compared to the situation, when a single transformer having the similar or same rating as the combination of the plural transformers has to be installed in an inside of the wind turbine. Also exchange of each of the less heavy and less voluminous transformer of the plural transformers may be easier than replacing or maintaining a single bigger transformer. The more transformers are provided, the easier a mass balancing for example of the nacelle may be achieved by appropriately locating the transformers within the nacelle, for example.

According to an embodiment of the present invention, the wind turbine comprises exactly two transformers or exactly three transformers or even more transformers. By the use of several transformers within the inside of the wind turbine, a weight distribution of components in the nacelle and/or the tower may be improved. Furthermore, using plural transformers may enable to operate the turbine at reduced rating, even if there is a failure on a part of the medium voltage or high voltage system.

The power generated by the one or more generators of the wind turbine may be divided to the two or more transformers in the same wind turbine. The transformers may be connected with cables and may be protected by the use of a switch gear that may be equipped with relay protection. The transformers may either be running in parallel operation or separately. The power rating of wind turbines may make it necessary to look for alternatives to the increasing size of the wind turbine step-up transformers. According to embodiments of the present invention, the complexity of the utilization of a single individual step-up transformer may be reduced by using two or more transformers. Furthermore, using plural transformers may reduce the load on the support structure, such as equipment within the nacelle and/or the tower. In particular, the transformers may be arranged having a smaller distance from the center of gravity of the transformer to the tower than conventionally applied. The gravity center of a single large transformer (as conventionally used) may be further out from the tower than the center gravity of plural smaller transformers. This may result in smaller bending moment in the structure and thereby may result in reduction of materials, weight and cost.

Furthermore, having plural transformers may enable to continue the production from a turbine, even in the case of a failure on part of the HV and/or MV component. Furthermore, one or more of the plural transformers may be located within the tower since each of the plural transformers may have a smaller size than the conventionally used single transformer. Thus, each one of the plural transformers may have a size such as it can be conveyed through the wind turbine tower door into the inside of the wind turbine tower. Furthermore, having plural transformers for example arranged within the nacelle may enable the reduction of the height of the nacelle. Thereby, the sidewind load may be reduced leading to the possibility to reduce material, weight and cost of the nacelle. Furthermore, the size of each of the plural transformers may be smaller than the size of one single transformer conventionally used, making replacement and/or maintenance of the plural transformers easier.

According to an embodiment of the present invention, the at least one second transformer comprises one or more transformers. In particular, the plural transformers may comprise an even number of transformers or an uneven number of transformers. The larger the number of the plural transformers, the smaller the weight and size of each individual transformer of the plural transformers may be, simplifying installation and also improving a mass balanced positioning.

According to an embodiment of the present invention, the wind turbine further comprises a wind turbine nacelle and a wind turbine tower, wherein the transformers are arranged within the wind turbine nacelle and/or the wind turbine tower.

The wind turbine nacelle as well as the tower may provide sufficient internal space for appropriately arranging the plural transformers therein. In particular, according to one embodiment of the present invention, all transformers may be arranged within the nacelle. According to another embodiment of the present invention, all transformers may be arranged within the wind turbine tower. According to a still further embodiment of the present invention, some of the plural transformers may be arranged within the nacelle and one or more of the plural transformers may be arranged within the wind turbine tower. Thereby, high flexibility may be provided.

According to an embodiment of the present invention, at least two, in particular all, of the transformers are arranged within the nacelle, wherein a transformer center of mass of each of the transformers lies within an annular region between a first cylinder and a second cylinder, each having as cylinder axis a longitudinal axis of the tower, the first cylinder having a radius of between 1.8 and 1.6 times a tower radius at the vertical position of the respective transformer center of mass, the second cylinder having a radius of between 1.0 and 1.2, times a tower radius at the vertical position of the respective transformer center of mass.

Each transformer can be associated with a transformer center of mass (also center of gravity). The tower may have for example a cylinder symmetrical configuration, wherein a tower wall may have substantially a circular shape in cross-section. The diameter of the tower may vary (or be constant) along the longitudinal axis (in particular being a cylinder symmetry axis) such that the diameter may e.g., decrease from the bottom vertically upwards. The longitudinal axis of the tower may correspond to a direction of the tower along which it has the largest extension.

The annular region within which the transformer center of mass of each of the transformers lies may be a region (e.g., outside the tower within the nacelle) close to or overlapping with portions of the wind turbine tower. Arranging the transformers close to the wind turbine tower (in terms of the radius to the longitudinal axis of the tower) may enable to reduce a bending moment and provide good mechanical stability. The first cylinder as well as the second cylinder are imagined geometrical objects but do not represent physical structures of the wind turbine. They are merely provided to define the location of the respective transformer center of mass.

The radius of the tower or the tower radius may relate to a radius of an outer surface of a tower wall. A radial distance of the transformer center of mass of each of the transformers from the longitudinal axis of the tower may amount to between 1.0 and 1.8 for example of the tower radius. Other transformers of the plural transformers may be arranged outside the annular region. By this configuration, mechanical loads acting on the nacelle and/or the tower may be reduced.

According to an embodiment of the present invention, the transformer centers of mass of at least an even number of transformers being mirror symmetrically arranged, in particular of all the transformers, have substantially a same vertical position, in particular being below the axis of the rotation shaft, further in particular below the rotation shaft.

When the two transformers or an even number of transformers or in particular all transformers have its respective transformer center of mass at a same vertical position, the load acting on the nacelle and/or tower may be reduced. If the vertical position of the transformer center of mass is below the axis of the rotation shaft, the stability of the wind turbine may be improved.

According to an embodiment of the present invention, at least two of the transformers are arranged within the nacelle such that a transformers center of mass of the combination of the two transformers lies within a cylindrical region around a longitudinal axis of the tower, the second cylindrical region having a radius of between 0.0 and 0.2, in particular 0.0 and 0.1, times a tower radius at the vertical position of the transformers center of mass.

The two of the transformers may be associated with a common center of mass which is referred to as the transformers center of mass. If the common center of mass of the combination of the two transformers is located within the cylindrical region, the gravity load of the transformers may effectively be supported by the wind turbine tower. The cylindrical region may be considered as a region around the longitudinal axis of the tower. The closer the transformers center of mass is to the longitudinal axis of the tower, the better the gravitational force acting on the transformers may be supported by the wind turbine tower and the lower the bending moment may be.

According to an embodiment of the present invention, the two transformers have similar, in particular same, construction and/or shape and/or type and are arranged within the nacelle substantially mirror symmetrically to a vertical plane lying in a rotation axis of a rotation shaft at which plural rotor blades are mounted.

The transformers may have same or similar size, same or similar rating, same or similar mechanical properties and/or same or similar electrical properties. The two transformers may also have same or similar weight. Thereby, costs may be reduced. Furthermore, a mirror symmetrical arrangement may substantially ensure also a mirror symmetrical arrangement or localization of the respective centers of gravity. Thereby, arrangement and positioning and also mounting within the nacelle may be simplified. The mounting or installation may thus also be performed in a substantially mirror symmetrical manner.

The rotation shaft axis of the rotation shaft may substantially lie in a horizontal plane or may be slightly tilted from the horizontal plane by for example 0° to 10°. A vertical direction as well as the rotation axis of the rotation shaft may lie within the vertical plane. The rotation axis of the rotation shaft may at the same time define a longitudinal direction of the nacelle.

According to an embodiment of the present invention, the two transformers, in particular all transformers, are spaced apart in (e.g., lateral) a direction perpendicular to the rotation axis by a distance between 0.7 and 1.3 times a tower diameter at a connection to the nacelle. Thereby, a compact installation of the transformers may be enabled, at the same time reducing load on wind turbine components, such as nacelle and/or tower.

According to an embodiment of the present invention, one of the transformers is arranged in a back portion of the nacelle, such that a transformer center of the mass of the one transformer lies in a vertical plane lying in a rotation axis of a rotation shaft at which plural rotor blades are mounted.

The back portion of the of the nacelle may be a region opposite to a front portion of the nacelle, at which the nacelle may comprise a hub connected to the rotation shaft, wherein at the hub plural rotor blades may be connected. During normal operation of the wind turbine, the front portion of the nacelle may face the wind. The two symmetrically arranged transformers may be arranged at the two sides of the rotation shaft. According to embodiments, however, at least one transformer of the plural transformers may not have a symmetrically arranged counterpart. This transformer (also referred to as a third transformer) may also be arranged close to a longitudinal axis of the tower but in the back portion of the nacelle. The back portion may be arranged overlapping or below an imagined (e.g., axial) extension of the rotor shaft backwards.

According to an embodiment of the present invention, each transformer comprises a magnetic core comprising soft ferromagnetic material, the magnetic core comprising for each electrical phase of plural phases, in particular of three phases, a magnetic core leg; each transformer comprising for each electrical phase of plural phases, in particular of three phases: a primary coil and a secondary coil (comprising different numbers of windings) arranged around one of the magnetic core legs such that the primary coil and the secondary coil are inductively coupled to each other; the magnetic core of each transformer further comprising, in particular integrally formed: a first connector core connecting first ends of all magnetic core legs of this transformer; a second connector core connecting second ends of all magnetic core legs of this transformer.

Embodiments of the present invention support a three-phase three-leg core or a three-phase five-leg core, for example. These configurations may also be referred to as core-type construction or shell-type construction, respectively. Other configurations are possible. The soft ferromagnetic material may focus magnetic field lines within the magnetic core, since the soft ferromagnetic material may have a high magnetic permeability such that the magnetic field is substantially confined within the space region occupied by the magnetic core. The primary coil and the secondary coil may comprise different numbers of conductor windings, as governed by the desired transformation ratio. Thereby, conventionally available transformers may be supported and utilized for implementation of embodiments of the present invention.

According to an embodiment of the present invention, each transformer comprises a casing enclosing the magnetic core and all primary coils and all secondary coils for all phases, and in particular a filling fluid within the casing.

According to another embodiment of the present invention, the transformers do not comprise a casing and are not surrounded by a particular liquid but may be exposed to air. The transformers may e.g., be configured as dry type transformers.

Each of the plural transformers is also together with the casing (or without casing) arranged in an inside of the wind turbine. The filling fluid may comprise a dielectric fluid, such as a synthetic fluid or for example mineral oil. In other embodiments, the filling fluid may comprise or be air.

According to an embodiment of the present invention, the wind turbine further comprises a breaker system for reversibly connecting the transformers to a utility grid, the breaker system comprising one of more multi-phase switch gears.

The breaker system may enable to connect or disconnect the wind turbine on demand to the utility grid. The utility grid may provide electric energy to plural consumers. Plural wind turbines may be connected to the utility grid to provide active power and/or reactive power to the utility grid. The wind turbine may be comprised in a wind park. One or more or all wind turbines of the wind park may each comprise plural transformers arranged within an inside of the respective wind turbine.

According to an embodiment of the present invention, each secondary coil of each transformer is connected to an input terminal of at least one switch gear and wherein output terminals of all switch gears are connected to each other and connected to the utility grid, or wherein all secondary coils of all transformers are connected to each other and are connected to an input terminal of exactly one switch gear, an output terminal of which is connected to the utility grid. Thereby, high flexibility may be provided.

According to an embodiment of the present invention, the wind turbine further comprises one or more converters, arranged within the nacelle; wherein each of the converters is either connected to exactly one of the transformers or each of the converters is connected to more than one of the transformers; at least one generator connected to the one or more converters.

The aspects defined above, and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION

Figure 2:
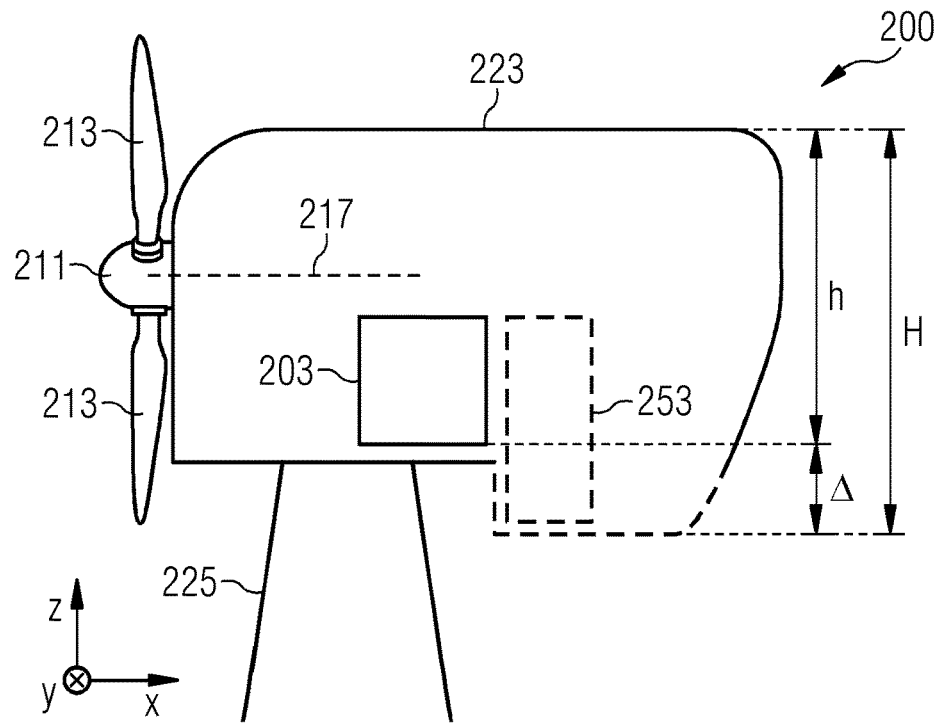
Figure 3:
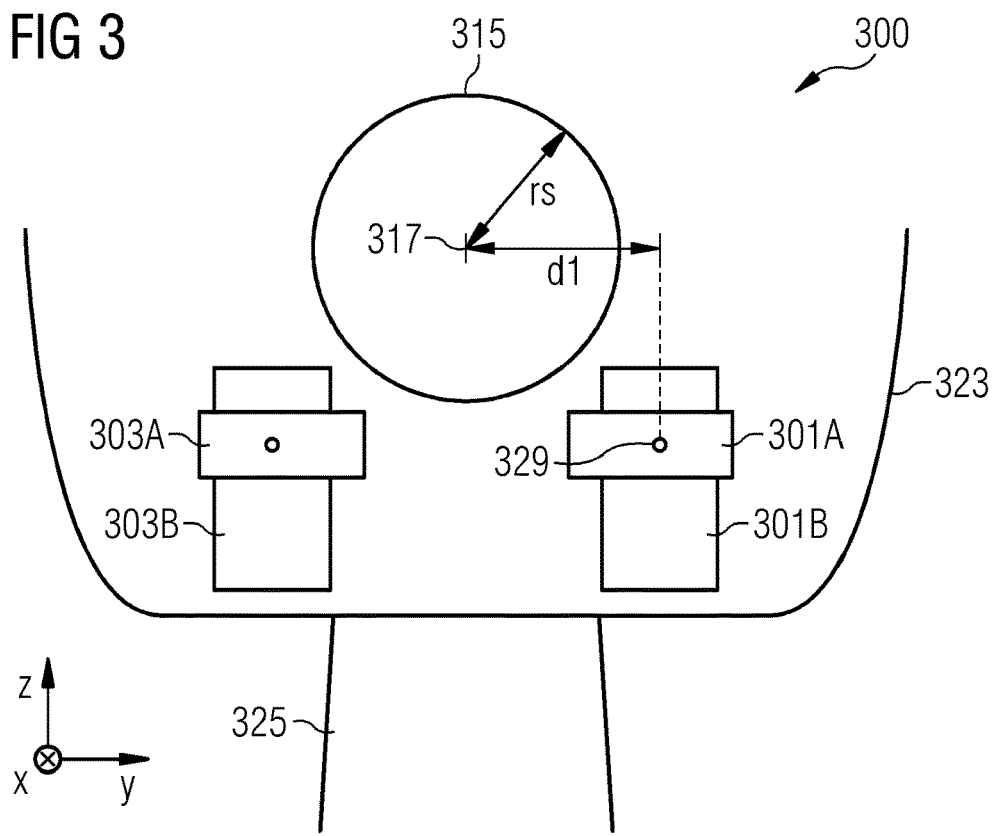
Figure 4:
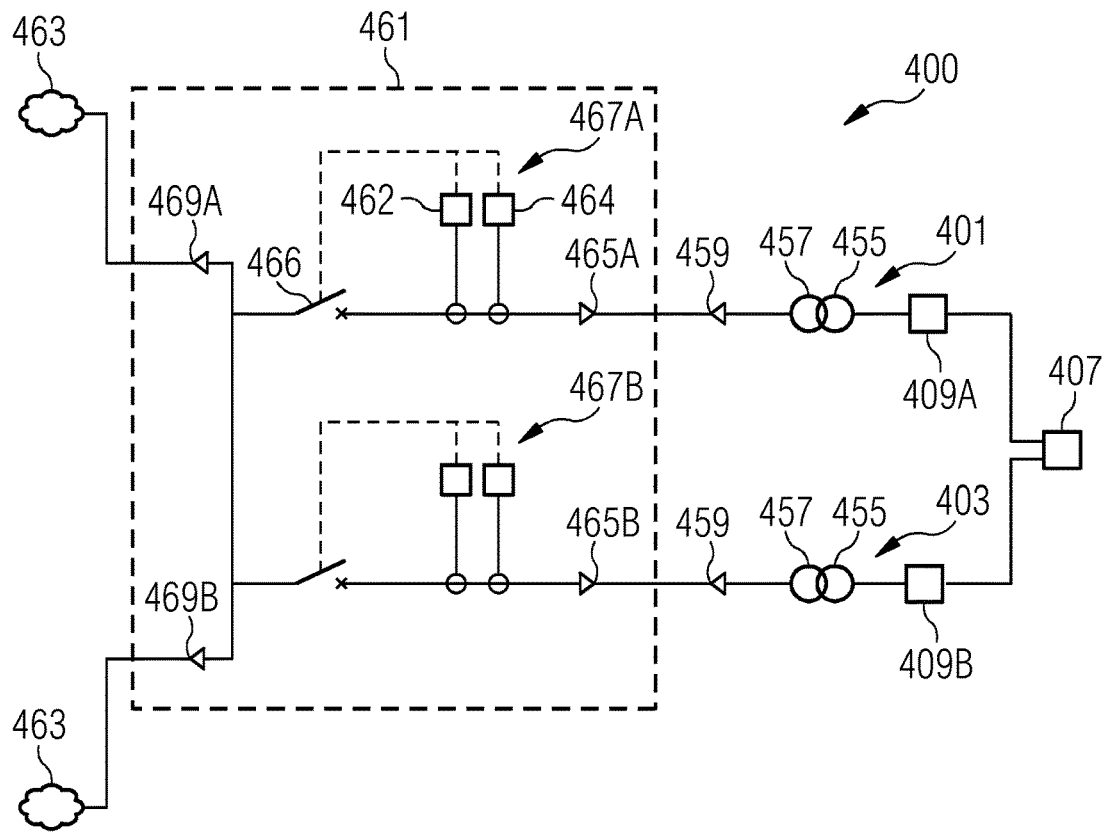
Figure 5:
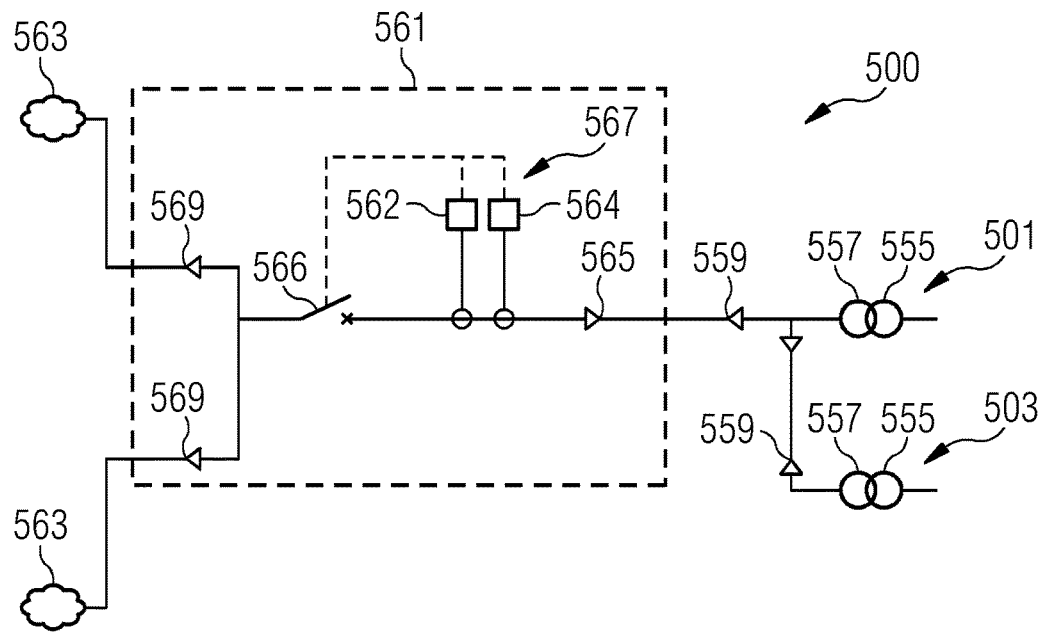
Figure 6:
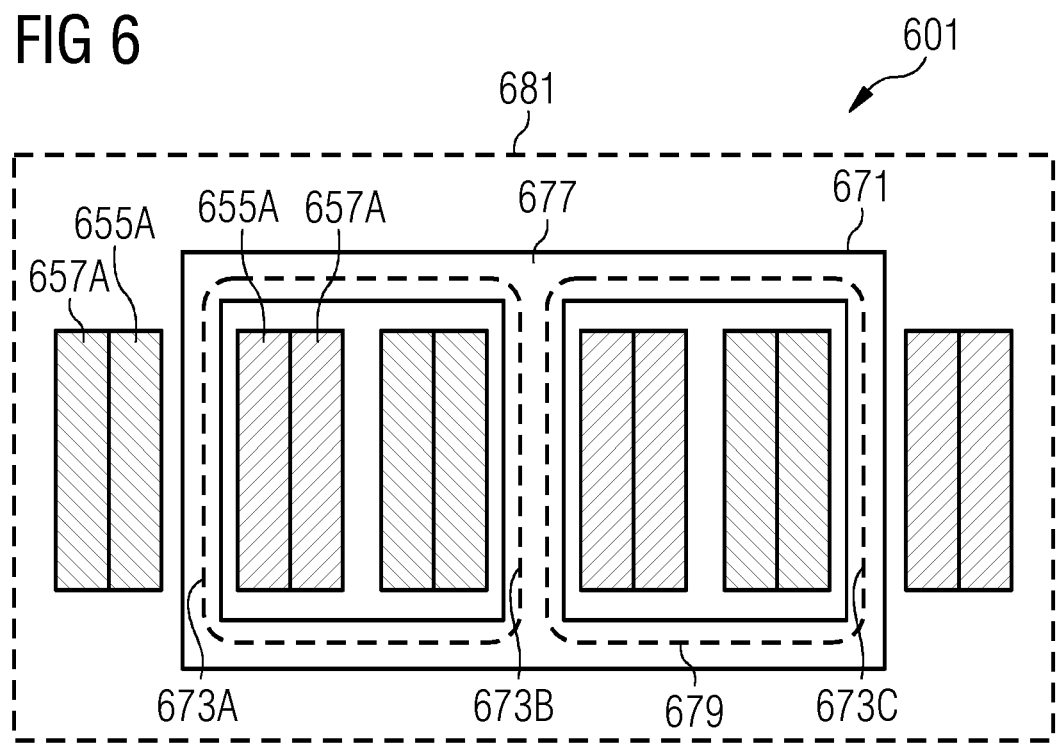
Figure 7:
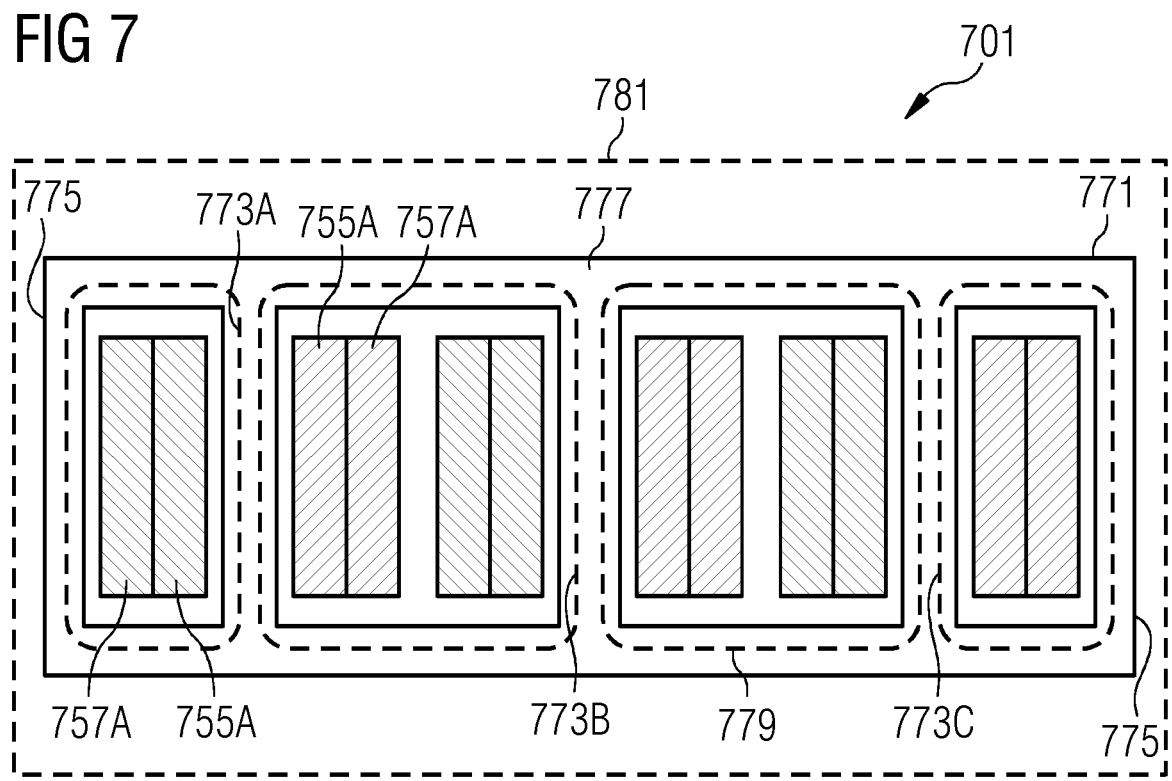

Some of the embodiments will be described in detail, with reference to the following figures, wherein like designations denote like members, wherein:

FIG. 1 schematically illustrates an elevational longitudinal cross-sectional view of a nacelle of a wind turbine according to an embodiment of the present invention;

FIG. 2 schematically illustrates a lateral longitudinal cross-sectional view of a portion of a wind turbine according to an embodiment of the present invention;

FIG. 3 schematically illustrates a back cross-sectional view of a portion of a wind turbine according to an embodiment of the present invention;

FIG. 4 schematically illustrates an electrical diagram of a wind turbine according to an embodiment of the present invention;

FIG. 5 schematically illustrates an electrical diagram of a wind turbine according to an embodiment of the present invention;

FIG. 6 schematically illustrates a side sectional view of one of plural transformers of a wind turbine according to an embodiment of the present invention; and FIG. 7 schematically illustrates a side sectional view of one of plural transformers of a wind turbine according to another embodiment of the present invention.

DETAILED DESCRIPTION

The illustration in the drawings is in schematic form. It is noted that in different figures, elements similar or identical in structure and/or function are provided with the same reference signs or with reference signs, which differ only within the first digit. A description of an element not described in one embodiment may be taken from a description of this element with respect to another embodiment.

The wind turbine 100 schematically illustrated in an elevational longitudinal cross-sectional view comprises plural transformers 101, 103, 105 comprising a first transformer 101 and a second transformer 103 and a third transformer 105 which are connectable to a generator 107 via a converter 109. The wind turbine comprises a hub 111 at which plural rotor blades 113 are connected. The hub 111 is mounted at a rotation shaft 115 which is coupled to the generator 107. Upon rotation of the rotation shaft 115 having a rotation axis 117, the generator 107 generates a power stream 119 of electric energy which is supplied to the converter 109. The power stream 119 is in particular a three-phase power stream.

In other embodiments of the present invention the power stream 119 may be a three-phase power stream or a power stream having any number of phases.

The converter 109 converts the power stream 119 to a fixed frequency power stream which is split in portions 102, 104 and 106 which portions are supplied to the first transformer 101, the second transformer 103 and the third transformer 105, respectively. The transformers 101, 103, 105 output respective output power streams 106, 108, 110 having a higher voltage and provide these power streams to a breaker system 121 which will be described in more detail with reference to FIGS. 4 and 5.

The vertical direction z is perpendicular to the drawing page in FIG. 1. The longitudinal direction x is parallel to the rotation axis 117 and the lateral direction y is perpendicular to the rotational axis 117.

The transformers 101, 103, 105 as well as the rotation shaft 115, the generator 107 and the converter 109 as well as the breaker system 121 are all arranged within a nacelle 123 which is rotatably supported on top of a wind turbine tower 125. The turbine tower 125 has a longitudinal axis 127 which is substantially a cylinder symmetry axis of the tower 125. The longitudinal axis 127 is arranged in the center of the cross-section of the tower 125.

The first transformer 101 has a first transformer center of mass 129, the second transformer 103 has a second transformer center of mass 131 and the third transformer 105 has a third transformer center of mass 133. An annular region 135 is defined to be a region between a first cylinder 137 and a second cylinder 139 wherein the first cylinder 137 has a radius of between 1.8 and 1.6 times a tower radius r at the respective vertical position of the respective transformer center of mass 129, 131, 133. The second cylinder 139 has a radius of between 1.0 and 1.2 times the tower radius r. Thus, the centers of mass 129, 131, 133 of the first transformer 101, the second transformer 103 and the third transformer 105, respectively, are arranged relatively close to the outer surface 141 of an outer wall of the cylinder 125.

A cylindrical region 143 around a longitudinal axis 127 of the tower 125 is defined at an inside of a cylinder having a radius of between 0.0 and 0.2 times the tower radius r at the vertical position of the transformers center of mass 145. Thereby, the transformers center of mass 145 is defined as the center of mass of the combination of the first transformer 101 and the second transformer 103. In the embodiment illustrated in FIG. 1, the transformers center of mass (i.e., the center of mass of the combination of the first transformer 101 and the second transformer 103) lies exactly at the longitudinal axis 127 of the tower. In other embodiments, this transformers center of mass 145 may lie at any point within the cylindrical region 143.

In the embodiment illustrated in FIG. 1, the first transformer 101 and the second transformer 103 (and in particular also the third transformer 105) have same shape and/or construction and/or type and are arranged within the nacelle 123 substantially mirror symmetrically to a vertical plane 147 which lies in the rotation axis 117 of the rotation shaft 115 and is vertically oriented, i.e., perpendicular to the drawing plane of FIG. 1.

As can be taken from FIG. 1, the first transformer 101, the second transformer 103 and the third transformer 105 are spaced apart in a (e.g., lateral) direction perpendicular to the rotation axis 117 by a distance d which amounts to between 0.7 and 1.3 times a tower diameter, i.e., 2×r, at the connection to the nacelle 123. As is illustrated in FIG. 1, the third transformer 105 is arranged in a back portion 149 of the nacelle 123, i.e., opposite to a front portion 151 at which the hub and the rotor blade 113 are arranged. The center of mass 133 of the third transformer 105 lies in the vertical plane 147 which vertical plane 147 lies in the rotation axis 117 of the rotation shaft 115.

FIG. 2 schematically illustrates a side sectional view of a portion of a wind turbine 200 according to an embodiment of the present invention. It is noted that elements similar in structure and/or function illustrated in different figures are labelled with reference signs differing only in the first digit. A description of one element not explicitly described with reference to a particular embodiment may be taken from the respective description of this element with regard to another embodiment or figure.

FIG. 2 omits details and in particular does not illustrate all elements in detail described with reference to FIG. 1 which are arranged within the nacelle 223. FIG. 2 illustrates in the side view a second transformer 203 which may be similarly configured as the second transformer 103 illustrated in FIG. 1.

For comparison to a conventional configuration, FIG. 2 illustrates a conventional transformer 253 which is illustrated in a dashed line which has a much bigger size (in particular in its vertical dimensions) than the second transformer 203. Due to this size reduction according to an embodiment of the present invention, also the vertical height h of the nacelle 223 can be designed by a difference Δ smaller than the vertical height H of a conventional nacelle.

FIG. 3 schematically illustrates a back cross-sectional view of a portion of a wind turbine 300 according to an embodiment of the present invention. In the sectional back view, different shape configurations of a first transformer 301 and a second transformer 303 are illustrated as variants 301A, 301B and 303A, 303B, respectively. The variants 301A, 303A have smaller vertical extensions than the variants 301B, 303B but have larger radial extents. It is noted that all variants of the first and second transformer 303, 301 lie below the rotational axis 317 of the rotation shaft 315. Further, the variants 301A, 303A even lie completely below the entire rotation shaft 315.

Furthermore, the center of gravity 329 of the variant 301A of the first transformer is (laterally) spaced apart from the rotational axis 315 by a distance d1 which is larger than the diameter rs of the rotational shaft 315.

FIG. 4 schematically illustrates an electrical diagram of a wind turbine 400 according to an embodiment of the present invention. The wind turbine 400 comprises a first transformer 401 and a second transformer 403 having a respective primary coil 455 and a secondary coil 457 which are inductively coupled to each other. At a secondary coil output terminal 459, the transformers 401, 403 are connected to a breaker system 461 for reversibly connecting the transformers 401, 403 to a utility grid 463.

FIGS. 4 and 5 illustrate different embodiments how the breaker system 461, 561 may be configured. In the embodiment 461 illustrated in FIG. 4, each secondary coil 457 of each transformer 401, 403 is connected to an input terminal 465A, 465B of at least one switch gear 467A, 467B, respectively. Output terminals 469A, 469B of the switch gears 467A, 467B, respectively, are all connected to each other and connected to the utility grid 463. Each switch gear 467A, 467B comprises a current and/or voltage measuring and/or monitoring device 462, 464 and a switch 466 controlled by the measuring and/or monitoring device 462, 464.

In the embodiment illustrated in FIG. 5, the secondary coils 557 of the first transformer 501 and the second transformer 503 are connected to each other and are connected to one input terminal 565 of exactly one switch gear 567 whose output terminal 569 is connected to the utility grid 563.

At the primary coils 455 of the first transformer and the second transformer, either two converters 409A, 409B (as illustrated in FIG. 4) are connected which are in turn connected to the generator or both primary coils 455 of the first transformer 401 as well as the second transformer 403 may be connected to each other and connected to a single converter (such as illustrated for example in FIG. 1). The configuration of connections and converters in FIG. 5 may be as illustrated in FIG. 4 or as illustrated in FIG. 1.

FIG. 6 and FIG. 7 illustrate side sectional views of one transformer 601, 701 of plural transformers which may be arranged within a wind turbine, and which may represent particular implementations of each of the transformers 101, 103, 105 illustrated in FIGS. 1, 2, 3, 4, 5.

The transformers 601, 701 illustrated in FIGS. 6 and 7 illustrate embodiments providing three electrical phases having a phase-shift of 120°. The transformer 601 illustrated in FIG. 6 comprises a magnetic core 671 comprising soft ferromagnetic material. For each of the phases A, B, C, the magnetic core 671 comprises a magnetic core leg 673A, 673B, 673C. The embodiment 701 additionally comprises outer legs 775. For each electrical phase, the transformer 601 comprises a primary coil 655A and a secondary coil 657A arranged around one of the magnetic core legs 673A such that the primary coil 655A and the secondary coil 657A are inductively coupled to each other. The magnetic core 671 comprises further a first connector core 677 connecting first ends of all magnetic core legs 673A, 673B, 673C and further comprises a second connector core 679 connecting second ends of all magnetic core legs 673A, 673B, 673C. A casing 681 encloses the magnetic core 671 and all primary coils 655A, 655B, 655C and all secondary coils 657A, 657B, 657C.

Features from different figures may be combined.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A wind turbine, comprising:
   plural transformers, comprising a first transformer and at least one second transformer, the transformers being connectable to at least one generator, wherein the transformers are arranged within an inside of the wind turbine;
   a wind turbine nacelle and a wind turbine tower, wherein the transformers are arranged within the wind turbine nacelle and/or the wind turbine tower, wherein at least two of the transformers are arranged within the nacelle, wherein a transformer center of mass of each of the transformers lies within an annular region between a first cylinder and a second cylinder, each having as cylinder axis a longitudinal axis of the tower, the first cylinder having a radius of between 1.8 and 1.6 times a tower radius at a vertical position of a respective transformer center of mass, and the second cylinder having a radius of between 1.0 and 1.2 times the tower radius at a vertical position of a respective transformer center of mass.

2. The wind turbine according to claim 1, wherein the at least one second transformer comprises one or more transformers.

3. The wind turbine according to claim 1, further comprising:
   at least one converter, wherein the transformers are connectable to the at least one generator by the at least one converter.

4. The wind turbine according to claim 1, wherein all of the transformers are arranged within the nacelle.

5. The wind turbine according to claim 1, wherein the transformer centers of mass of at least an even number of transformers being mirror symmetrically arranged have substantially a same vertical position.

6. The wind turbine according to claim 5, wherein at least two of the transformers are arranged within the nacelle such that a transformers center of mass of the combination of the two transformers lies within a cylindrical region around a longitudinal axis of the tower, the cylindrical region having a radius of between 0.0 and 0.2 times a tower radius at the vertical position of the transformers center of mass.

7. The wind turbine according to claim 6, wherein the two transformers have similar or same construction and/or shape and/or type and are arranged within the nacelle substantially mirror symmetrically to a vertical plane lying in a rotation axis of a rotation shaft at which plural rotor blades are mounted.

8. The wind turbine according to claim 1, wherein the two transformers, and/or all transformers, are spaced apart laterally by a distance between 0.7 and 1.3 times a tower diameter at a connection to the nacelle.

9. The wind turbine according to claim 1, wherein one of the transformers is arranged in a back portion of the nacelle, such that a transformer center of the mass of the one transformer lies in a vertical plane lying in a rotation axis of a rotation shaft at which plural rotor blades are mounted.

10. The wind turbine according to claim 1, each transformer comprising:
a magnetic core comprising soft ferromagnetic material,
the magnetic core comprising for each electrical phase of plural phases a magnetic core leg;
each transformer comprising for each electrical phase of plural phases:
a primary coil and a secondary coil arranged around one of the magnetic core legs such that the primary coil and the secondary coil are inductively coupled to each other;
the magnetic core of each transformer further comprising and/or integrally forming:
a first connector core connecting first ends of all magnetic core legs of this transformer;
a second connector core connecting second ends of all magnetic core legs of this transformer.

11. The wind turbine according to claim 10, each transformer comprising:
a casing enclosing the magnetic core and all primary coils and all secondary coils for all phases.

12. The wind turbine according to claim 11, further comprising:
a filling fluid within the casing.

13. The wind turbine according to claim 10, wherein the plural phases comprises three phases.

14. The wind turbine according to claim 1, further comprising:
a breaker system for reversibly connecting the transformers to a utility grid, the breaker system comprising one of more multi-phase switch gears.

15. The wind turbine according to claim 14,
wherein each secondary coil of each transformer is connected to an input terminal of at least one switch gear and wherein output terminals of all switch gears are connected to each other and connected to the utility grid, or
wherein all secondary coils of all transformers are connected to each other and are connected to an input terminal of exactly one switch gear, an output terminal of which is connected to the utility grid.

16. The wind turbine according to claim 1, further comprising:
one or more converters, arranged within the nacelle;
wherein each of the converters is either connected to exactly one of the transformers or each of the converters is connected to more than one of the transformers;
at least one generator connected to the one or more converters.

17. The wind turbine according to claim 1, wherein the transformer centers of mass of all the transformers have substantially a same vertical position.

18. The wind turbine according to claim 1, wherein the transformer centers of mass of the transformers have substantially a same vertical position, and wherein the same vertical position is below the axis of the rotation shaft and/or below the rotation shaft.

* * * * *